March 19, 1940.	G. W. WALTON	2,193,953
PHOTOELECTRIC CELL
Filed Feb. 12, 1930	2 Sheets-Sheet 1
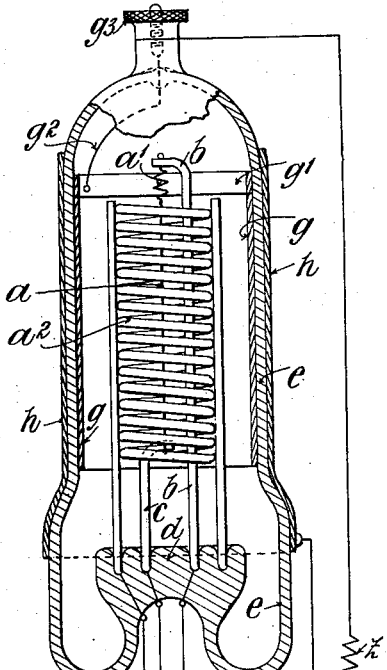
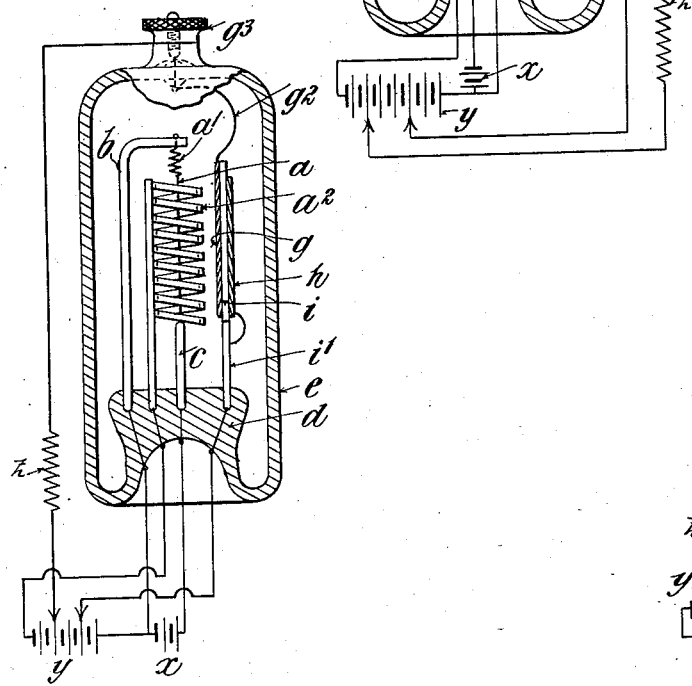
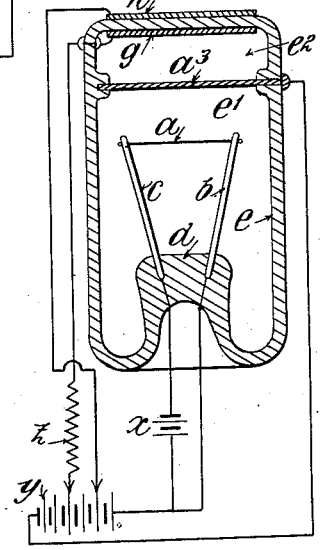
INVENTOR.
G. W. Walton.
Per A. Millward Hack.
his Attorney.

March 19, 1940.      G. W. WALTON      2,193,953
PHOTOELECTRIC CELL
Filed Feb. 12, 1930      2 Sheets-Sheet 2

INVENTOR
George William Walton.

Patented Mar. 19, 1940

2,193,953

UNITED STATES PATENT OFFICE 2,193,953

PHOTOELECTRIC CELL

George William Walton, London, England

Application February 12, 1930, Serial No. 427,880
In Great Britain February 14, 1929

11 Claims. (Cl. 250—41.5)

This invention relates to improvements in light sensitive cells of the photoelectric type in which electrons are emitted from the illuminated surface of a cathode or light sensitive electrode as distinct from the type in which light causes a change in the electrical resistance of some semiconducting material, such as selenium.

The primary object of the present invention is to produce a photoelectric cell in which the electrical response to light is increased as compared with known light sensitive cells of any type, it also overcomes other defects of ordinary photoelectric cells. One of these defects is that the current of such cells is so minute that quite an appreciable time is taken in charging the conductors in and about the cell, thus giving rise to a delayed action, which is further accentuated by unavoidable leakages from such conductors, so that extreme care is required in choosing and disposing the electrodes of the cell and the system of wiring and devices necessarily used therewith, and also in shielding the cell and its network of accompanying conductors from extraneous electric and magnetic influences, whereas in a device according to this invention, the greater part, if not the whole, of the required action is at the surface on which light falls and at that point produces variations in a relatively large current between two or more electrodes, the action being almost analogous to a trigger effect, and stray extraneous influences having comparatively no effect on the performance of the device.

The present invention comprises in a photoelectric cell, the use of any means of subjecting a photoelectric surface to continuous cathode ray bombardment in such a manner that the surface, due to emission of secondary electrons, does not carry the constant component of the exciting thermionic current and an electric current is caused to pass between the photoelectric surface and an anode by the action of rays of light on the same photoelectric surface, either alone or together with the influence of one or more electrodes and/or coils in or about the same cell actuated directly or indirectly through internal and/or external connections and/or devices by the primary action of the variations of the electric current between the aforesaid sensitive surface and the anode.

It is already a known fact that increased photoelectric activity is exhibited by a material after electronic or cathode ray bombardment and that the increased activity is greatest immediately after such bombardment gradually decreasing with lapse of time until normal.

Now according to this invention, such known fact is utilized by providing means for the continuous electronic bombardment of the active surface in such a way that the photoelectric action is not seriously masked or interfered with, thereby maintaining the active surface in a state of high sensitivity.

A further known fact is that some electrons released by the action of light on the photoelectric material do not escape from the surface of such material, due to the retarding or stopping influence of surface atoms.

According to this invention, such a drawback is partly, or wholly, overcome so that the tendency of the electrons to leave the surface of an electrode is increased by the provision of means whereby a repulsive influence is exerted on the electrons in addition to the attractive influence of the anode, thereby increasing the accelerative force exerted on the electrons.

It is a further known fact that electronic emission is greater from a surface from which light emerges than from one on which the light is incident.

The present invention also utilizes this fact, as it also allows the anode to be placed very close to the active surface by which means all, or some, of the light emerging from the latter is reflected back to it by the anode.

As the means provided for the bombardment of the active surface in themselves form the elements of a thermionic valve, additional electrodes, such as grids, may be employed between the source of cathode rays and the anode by means of which the photoelectric current to or from the photoelectric surface may be amplified, or modulated, or oscillations may be produced which are modulated by the electric current. In modifications, external electrodes or coils may be employed to secure the same results.

The invention will now be described making reference to the accompanying drawings, it being understood that these are purely illustrative and that the invention is by no means limited to the types described.

Figure 1 is a view, more or less diagrammatical, in longitudinal section of a photoelectric cell embodying this invention;

Figures 2 and 3 are similar views of modifications;

Referring more particularly to Figure 1, a dull emitter filament $a$, carried by the supports $b$ and $c$ mounted in the foot $d$, is kept taut by suitable springing, such as $a^1$, and through wires connected to the supports $b$ and $c$ in the foot $d$, is heated by the battery $x$. Surrounding the filament $a$ is an anode $a^2$ which is formed conveniently as a helix of relaitvely heavy wire and has applied to it by the battery $y$ a positive potential relative to the filament $a$. The supports of the filament $a$ and the anode $a^2$ are fixed in a foot $d$ fused in the envelope $e$. On the inner surface of the envelope $e$ is deposited a cathode $g$, preferably not projecting beyond the ends of the anode $a^2$. A connection is made from the cathode $g$ by means of a metallic ring $g^1$ and lead $g^2$ to a terminal $g^3$ to which is applied through an output device $z$, which is an impedance such as a resistance, inductance or the primary of a transformer, a potential negative relative to that of the anode $a^2$ but positive to the filament $a$. The cathode $g$ is preferably a semi-transparent deposit. The outside surface of the envelope $e$ is silvered opposite the cathode $g$ and overlapping the latter. This silvered portion $h$ is given a negative potential relative to the cathode $g$ and has a slit or window in it which is unsilvered opposite to the cathode $g$ through which light enters, so that the cell by reason of repeated internal reflections has approximately black body absorption. The silvered portion $h$ also provides electrical shielding. The filament should be preferably of a low temperature emitting type in order that the shortest wave length of light emitted by it shall be longer than that at which the photoelectric emission commences from the cathode, thereby insuring that the cathode shall not respond to any light from the filament. The action of this cell is that electrons emitted by the filament $a$ are attracted by the anode $a^2$, some pass through the spaces of the latter, strike the cathode $g$ dislocating secondary electrons which may be absorbed by the anode $a^2$ or the cathode $g$, or both, dependent on the relative potentials. By suitable adjustment of these potentials, together with adjustment of the potential on the sub-cathode $h$, it can be arranged that the numbers of electrons entering and leaving the cathode $g$ are equal. Under these conditions, no appreciable energy is dissipated at the cathode $g$, which, therefore, apart from thermal radiation from the filament $a$ and the anode $a^2$ will remain cool. The action of light thrown on the cathode $g$ is to increase the number of electrons leaving it, and the device, if suitably adjusted, further augments this action.

Figure 4:
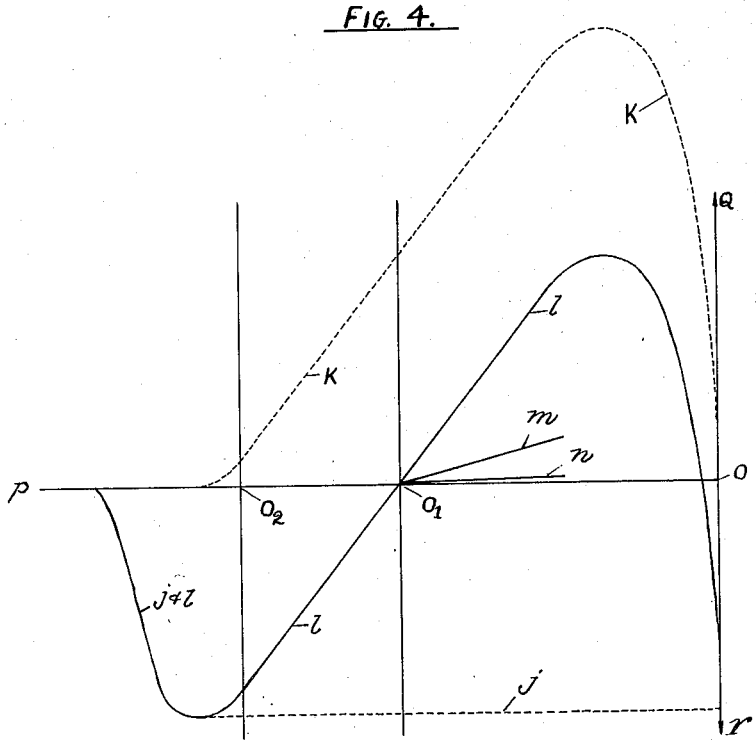
Figure 4 shows curves illustrating the adjustment and response of the device.

Figure 4 illustrates the effect of varying the potential of the cathode $g$ relatively to the anode $a^2$, the potential of the filament $a$ being kept constant relatively to the anode $a^2$. In these curves, the potential of the cathode $g$ relative to the anode $a^2$ is plotted as abscissa $o—p$ and the electron current in the cathode $g$ is plotted as ordinate. Currents in the direction $o—q$ are due to electrons leaving the cathode and currents in the direction $o—r$ are due to electrons arriving at the cathode. Curve $j$ represents the current in the cathode $g$ due to electrons arriving at the cathode from the filament. It will be noted that, starting with the potential of the cathode equal to that of the anode, and making the former more and more negative relative to the latter, the number of electrons trapped by the anode does not at first change. Eventually, however, a point is reached at which the number of electrons reaching the cathode rapidly falls off. Under these circumstances, the potential of the cathode $g$ is approaching that of the filament $a$.

Curve $K$ represents the current due to the secondary electrons emitted by the cathode $g$ as a result of the bombardment thereof by the electrons from the filament source. Curve $l$ represents the resultant current which can be regarded as flowing between the elements $g$ and $a^2$ of the photoelectric couple due to the primary and secondary electron currents (curves $j$ and $k$ respectively). When these two component currents are equal in magnitude, their resultant is zero and at this point, represented in curve $l$ by $o^1$, the numbers of electrons entering and leaving the cathode are equal and the energy dissipation at the cathode due to electron flow is zero. The potentials on the electrodes may with advantage be so adjusted that the device operates at this point when no light is falling upon the cathode from an external source. It can be seen from curve $l$ that the photoelectric couple will under these conditions have a negative resistance. The primary effect of light falling upon the cathode under these circumstances is indicated by curve $m$ which is plotted from the point $o^1$ as origin, increase of light intensity from zero being plotted in the direction $o^1—o$ and photoelectric current due to the consequent photoelectric emission being plotted as ordinate. The current is in the same direction as that due to the secondary electrons and produces a change in the potential difference across the external impedance $z$ which in turn has the effect of reducing the resultant potential difference across the photoelectric couple. Owing to the negative resistance characteristic of the couple, the decrease in potential difference causes an increase in current in the same direction as the primary photo-electric current of curve $m$. It is therefore the sum of the primary photoelectric current and the current due to the negative resistance effect which is the actual photoelectric response. This actual response would be represented by a line from $o^1$ more steeply inclined than $m$. For example, it may be represented by a line having a slope equal to or greater than curve $l$ in the region $o^1$. The photoelectric response in the absence of the electron bombardment from the filament is indicated by curve $n$. Curves $m$ and $n$ are not drawn to scale and the differences between their slopes would be much greater.

Instead of point $o^1$ corresponding to zero light intensity, it may correspond to the mean intensity of light variations and a point such as $o^2$ may represent zero light intensity. In this way, instead of the current being zero for zero light intensity, it is zero for mean light intensity and the average current is accordingly reduced. Under these conditions, the current through the couple is negative for light intensities below the mean value.

The sub-cathode or electrode $h$ is not essential to the action above described, but it serves to exert a repulsive effect on the electrons liberated from the cathode $g$ and its use improves the characteristics of the device for when suitable potentials are applied to it the effect is equivalent to reducing the distance between the anode $a^2$ and the cathode $g$, and also voltage impulses from the output device $z$ may be applied to it through any suitable coupling to further increase the self-augmentation. Similarly, any control device, such as a grid or grids, disposed between the filament $a$ and the anode $a^2$, or a coil around the device, as known in thermionic valves, may have impulses applied to them from the output device $z$ for the same purpose. It is sometimes desirable that the impulses from a photoelectric cell should modulate electrical oscillations or should be modulated by an electrical oscillation for which purpose a circuit oscillatory, or otherwise, may be included in or coupled to one or more of the circuits of the electrodes or control devices used and the oscillations may be self generated by the cell.

It is preferable that the material of the cathode should be one which is susceptible to cathode ray influence such as the alkali halides or hydrides, for instance, potassium hydride. The cell usually should have a high vacuum but may contain gas or gases, inert or otherwise, for instance, argon, helium, or other of the rare gases, at any degree of pressure to suit particular requirements.

The output device $z$ may be contained within the envelope $e$ or a base attached thereto, or may be attached to the cell as an integral part, terminals being provided suitably connected to it. When light impulses of varying intensities actuate the cell, the latter may be adjusted so that the current in the cathode circuit is zero for the mean intensity thereby enabling the device to be used over a wider range of light intensities without an undue rise of temperature at the cathode.

The anode should preferably be of an area equal to the opposite surface of the cathode and disposed in such a way that the distance from the anode to the cathode is of aproximately constant value at all points. The anode may be perforated, or may be of wire gauze or be a grid of wires or strips. In any case, the anode has perforations or the equivalent and so is permeable to electrons and yet has portions which can intercept electrons in their passage from the filament, or source of electrons, to the cathode.

The electrode or sub-cathode $h$ may be a conducting fluid contained in an annular chamber around the cathode $g$, the chamber being preferably an integral part of the envelope $e$.

It is advantageous that the sub-cathode should be approximately equal in area to the cathode and that there should be an approximately even thickness of glass between the two so that, by reason of the high specific inductive capacity of the glass, a considerable electrostatic influence is exerted on the cathode.

The cell need not have the concentric arrangement shown in Figure 1, nor need the cathode or sub-cathode be on the envelope. Figure 2 shows one departure in which the filament $a$ (straight, inverted V-shaped or of any other form) has around it an anode $a^2$ formed as a flattened helix of metal ribbon or wire. Opposite one of the flattened faces of the anode $a^2$ is disposed a photoelectric cathode $g$ deposited on a support $i$ which may be glass or mica. A connection from the cathode $g$ is made through the lead $g^2$ to the terminal $g^3$. The support $i$ may be attached to one or more metallic supports $i^1$ which may also act as a connection to the sub-cathode $h$ which is on that face of the support $i$ opposite to the one supporting the cathode $g$. Light may enter through one or more apertures in the sub-cathode $h$, or in a direction approximately parallel to the planes of the cathode $g$ and sub-cathode $h$, the latter direction being of very great advantage in some cases. Another cathode may be mounted opposite the other flat surface of the anode $a^2$ and connected to the terminal $g^3$ or independently connected to form a device capable of responding to two separate light impulses at the same time and independently.

Cathodes sub-divided into two or more sections connected to independent output circuits are useful in some cases, for instance, three color television.

Figure 5:
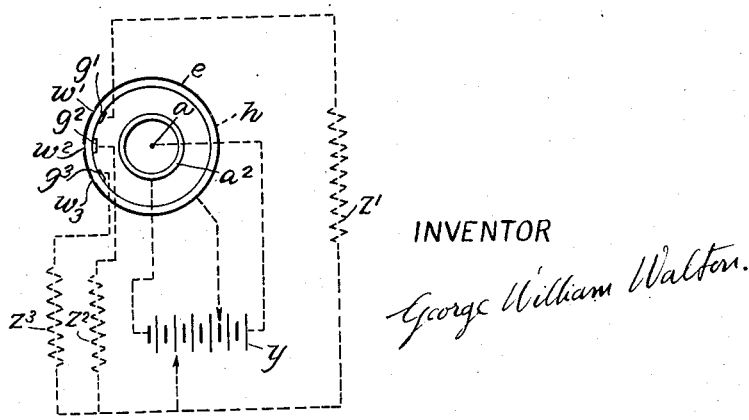
Figure 5 is a diagrammatic view in sectional plane of a modified construction according to the invention.

Such an arrangement is illustrated diagrammatically in Figure 5. Behind slits or windows $w^1$, $w^2$ and $w^3$ in the opaque sub-cathode coating $h$ are arranged cathodes $g^1$, $g^2$ and $g^3$. The cathodes are connected in circuit with separate external impedances $z^1$, $z^2$ and $z^3$. Electrons from the filament $a$ pass through an anode $a^2$ (such as that shown in Figure 1) which is permeable to electrons and bombard the cathodes.

In the construction shown in Figure 3, the filament $a$ of any desired shape and supported in the manner before described but in a horizontal plane, is held within the envelope $e$. The upper part of the envelope $e$ is provided interiorly with a cathode $g$ and exteriorly with a sub-cathode $h$. The anode takes the form of a thin metallic partition $a^3$ sealed within the envelope $e$ between the cathode $g$ and the filament $a$, thus dividing the interior of the envelope into two compartments $e^1$ and $e^2$. The anode $a^3$ is such as to allow cathode rays to pass through it and prevent light from the filament $a$ affecting the sensitive surface. The chamber $e^2$ may have a different pressure or a different gas to that contained within the chamber $e^1$. The sub-cathode $h$ should have a less positive potential than the cathode $g$.

I declare that what I claim and desire to secure by Letters Patent is:

1. A photoelectric cell comprising a photoelectric cathode, a source of electrons and an anode, associated with means for applying to said cathode, said source and said anode potentials of such magnitude that, when no light is falling from an external source upon said cathode, the rate at which electrons enter said cathode from said source is substantially equal to the rate at which electrons are ejected from said cathode and absorbed by said anode.

2. A photoelectric cell comprising a photoelectric cathode adapted to be exposed to light variations of a predetermined mean intensity, a source of electrons and an anode associated with means for applying to said cathode, said source and said anode potentials of such magnitude that, when light of said mean intensity is falling upon said cathode, the rate at which electrons enter said cathode from said source is substantially equal to the rate at which electrons are ejected from said cathode and absorbed by said anode.

3. A photoelectric cell arrangement comprising a photoelectric cathode, a source of electrons, an anode and means for applying to said cathode, said source and said anode potentials of such magnitude that the path between said cathode and said anode has a negative resistance.

4. A photoelectric cell arangement comprising a photoelectric cathode, a source of electrons, an anode disposed between said cathode and said source of electrons, and means for applying to said cathode, said source of electrons and said anode potentials of such magnitude that the path between said cathode and said anode has a negative resistance.

5. A photoelectric cell arrangement comprising a photoelectric cathode, a source of electrons, an anode permeable to electrons and disposed in the path of electrons from said source of electrons to said cathode, and means for applying to said cathode, said source and said anode potentials of such magnitude that the path between said cathode and said anode has a negative resistance.

6. A photoelectric cell arrangement comprising a photoelectric cathode, a source of electrons, an anode permeable to electrons and having portions lying in the direct path of electrons from said source of electrons to said cathode, and means for applying to said cathode, said source and said anode potentials of such magnitude that the path between said cathode and said anode has a negative resistance.

7. A photoelectric cell arrangement comprising a photoelectric cathode, a source of electrons, an anode permeable to electrons and having portions adapted to intercept electrons in their passage in a straight line from said source of electrons to said cathode, and means for applying to said cathode, said source and said anode potentials of such magnitude that the path between said cathode and said anode has a negative resistance.

8. A photoelectric cell arrangement comprising a photoelectric cathode, a source of electrons, an anode, an impedance element connected to said cathode, and means for applying to said source, said anode and, through said impedance element, to said cathode potentials of such magnitude that the discharge path between said cathode and said anode has a negative resistance.

9. A photoelectric cell arrangement comprising a source of electrons, a photoemissive cathode positioned to receive electrons from said source of electrons, an anode positioned to receive electrons from said photoemissive cathode, a connection including an impedance element and a source of potential between said photoemissive cathode and said anode, and means for applying a source of potential between said cathode and said source of electrons, said potentials being so balanced that the circuit constituted by said impedance connection and the discharge path between the said photoemissive cathode and the said anode has an effective impedance which is less than that of said impedance element, whereby an increased potential drop across said impedance element will increase the flow of electrons from said cathode to said anode and through said impedance element.

10. A photoelectric cell arrangement comprising a source of primary electrons, a photoemissive cathode in position to be bombarded by said primary electrons and emit secondary electrons, an anode, sources of potential between each of said above recited elements, an impedance in series with the source of potential between said photoemissive cathode and said anode, the potentials being so balanced that for a predetermined light intensity on said photoemissive cathode the number of electrons leaving said photoemissive cathode as the result of photoemission and secondary emission will equal the number of electrons reaching said photoemissive cathode from said primary source of electrons.

11. A photoelectric cell arrangement comprising a source of primary electrons, a photoelectric cathode in position to be bombarded by said primary electrons and emit secondary electrons, an anode, sources of potential between each of said above recited elements, and an impedance in series with the source of potential between said photoemissive cathode and said anode, the potentials being so balanced that a decrease in the potential drop between said photoemissive cathode and said anode due to increased current flowing through said impedance will increase the number of secondary electrons emitted from said photoemissive cathode while the number of primary electrons reaching said cathode will remain substantially the same thereby giving to the photoelectric coupling between said anode and said photoemissive cathode a negative resistance characteristic.

GEORGE WILLIAM WALTON.